March 19, 1935. C. J. CLARKE 1,995,242
FISHLINE REEL HOLDER
Filed Sept. 20, 1933
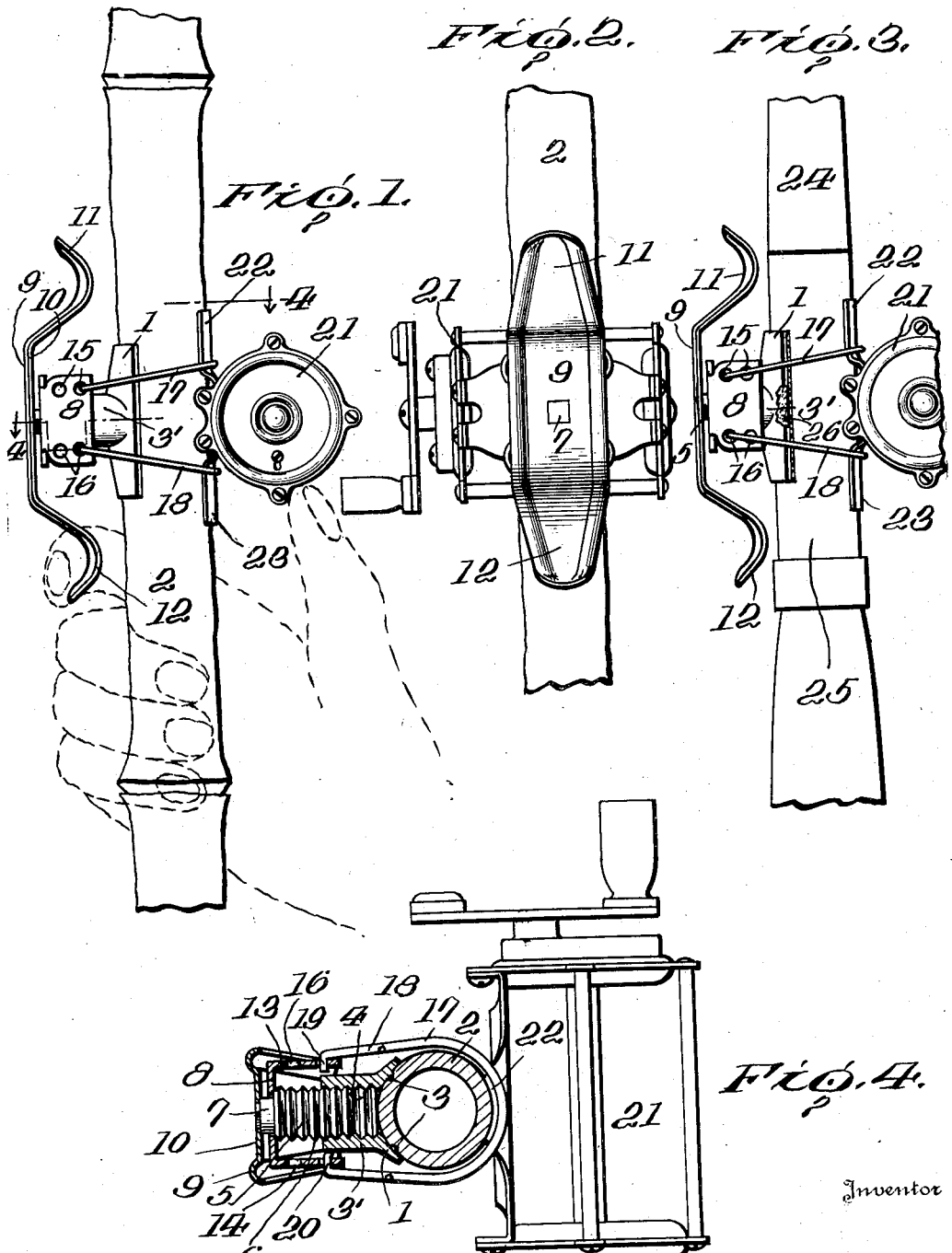
Inventor
C. J. Clarke Patented Mar. 19, 1935

1,995,242

UNITED STATES PATENT OFFICE 1,995,242

FISHLINE REEL HOLDER

Charles Jackson Clarke, Kingsburg, Calif.

Application September 20, 1933, Serial No. 690,259

19 Claims. (Cl. 43—22)

My invention relates to improvements in fish line reel holders.

The object of my invention is to provide a holder of this type in which the ordinary fishing reel may be readily and firmly clamped to either a bamboo or steel fishing rod of different sizes varying from three-fourths of an inch to one and one-half inches.

Another object of my invention is to provide a holder of this type which can be readily applied to any rod without slipping it over the handle or the guide end of the rod and thus making the same more applicable to rods of vastly different types and sizes.

A further object of my invention is to provide a holder in which a hand-hold is provided for casting or when winding the reel when pulling in a fish.

A still further object of my invention is to provide a cheap, simple and effective holder having certain details of structure and combination of parts hereinafter more fully described.

In the accompanying drawing:

Figure 1 is a side elevation of my improved holder applied to a bamboo fishing rod and showing the hand-hold feature.

Fig. 2 is a top plan view of Fig. 1.

Fig. 3 is a side elevation similar to Fig. 1, showing the holder applied to a steel rod.

Fig. 4 is an enlarged transverse sectional view taken on the line 4—4 of Fig. 1.

Referring to the drawing, 1 represents the base which is of an elongated form and curved to fit the contour of the fishing rod 2, which as shown in Fig. 1, is of the bamboo type. The inner face of the base is provided with slight elevations 3, which are adapted to slightly depress the rod to prevent the base slipping longitudinally and laterally on the rod. These elevations are not absolutely necessary as a piece of rubber or other similar material 26 can be placed between the base and the rod to accomplish the same results.

The base 1, at the center, is provided with an outwardly extending enlarged boss 3', which is internally threaded as indicated at 4. Screwed therein is a threaded rod 5, the threads 6 of which end short of the outer end thereof, forming a plain smooth annular portion 7 upon which is loosely mounted the yoke 8. The threads of the rod prevent any inward movement of the yoke and its outward movement is prevented by the hand-hold 9, which is rigidly secured to the extreme outer end of the rod.

The hand-hold 9 as shown is of an elongated form having the flat central portion 10 provided at each end with the downwardly and upwardly curved portions 11 and 12 for forming the gripping portion for the fingers while casting or reeling, as shown in Fig. 1 of the drawing. The hand-hold, as is understood, also forms the means for turning the rod 5 for operating the holder as later described.

The side walls 13 and 14 of the yoke 8 extend inwardly over the outer end of the boss 3' and each side wall is provided with two series of openings 15 and 16 adjacent their ends to provide for the adjustment and removal of the clamping wire or bands. While I have shown each series having two openings, it will be understood that there could be a greater number of openings to allow for a greater adjustment of the clamping wires or bands.

The clamping wires or bands 17 and 18, as shown in Fig. 4 of the drawing, are of U-shaped form having hooked upper ends 19 and 20 and are adapted to encircle the fishing rod and the hooks enter the holes of the oppositely arranged series of openings in the side walls 13 and 14 of the yoke. The fishing reel 21 is of a standard type having a base provided with the outwardly extending arms 22 and 23 curved to fit the contour of the rod. The clamping wires or bands 17 and 18 pass over the arms 22 and 23 and by turning the hand-hold 9 to the left the threaded rod 5 is turned in the boss 3 and moves outwardly carrying with it the yoke 8 and drawing the clamped wires 17 and 18 tightly down on the arms 22 and 23 of the reel and firmly clamping the same on the rod. By having the two gripping portions 11 and 12 it will be seen that a finer adjustment can be had, as it is not necessary to turn the hand-hold a complete turn to bring one of the gripping portions into proper position.

The holder in some instances can be placed on or removed from the rod by sliding the rod through the clamping wire, while in other instances where the handle of the rod is large or the line guides are exceptionally large the clamping wires 17 and 18 would have to be removed from the yoke by removing the hooked ends from the openings in the yoke, and placing the holder along the side of the rod and then placing the clamping wires around the pole and snapping the hooked ends into the openings in the yoke. In steel rods as shown in Fig. 3, the rod 24, adjacent the handle 25 is provided with an enlarged portion over which the holder is placed.

While I have shown my holder as applied to a fishing rod for holding a reel thereon it will be understood that the same could be used for clamping any article to a rod, without departing from my invention.

Having thus described my invention, what I claim and desire to secure by Letters Patent is:

1. A clamp comprising a base, a rod threaded therein, a yoke loosely mounted on the rod and held against longitudinal movement, an operating member rigidly carried by the outer end of the rod, and loops carried by the yoke for encircling a member whereby the same can be clamped against the base by the turning of the rod.

2. A clamp comprising a base, a rod threaded therein, a yoke loosely mounted on the rod and held against longitudinal movement, an operating member rigidly carried by the outer end of the rod, and loops detachably carried by the yoke for encircling a member, whereby the same can be clamped against the base by the turning of the rod.

3. A fish line reel holder, comprising a base, adapted to fit a fishing rod, a rod threaded therein, a yoke loosely mounted on the rod and held against longitudinal and lateral movement, a hand-hold rigidly carried by the outer end of the threaded rod, and loops carried by the yoke for encircling a fishing rod for clamping a reel thereto.

4. A fish line reel holder, comprising a base, adapted to fit a fishing rod, a rod threaded therein, a yoke loosely mounted on the rod and held against longitudinal movement, a hand-hold rigidly carried by the outer end of the threaded rod, and detachable loops carried by the yoke for encircling a fishing rod for clamping a reel thereto.

5. A fish line reel holder, comprising a base, adapted to fit a fishing rod, a rod threaded therein, a yoke loosely mounted on the rod and held against longitudinal and lateral movement, a hand-hold having a gripping surface at each end rigidly carried by the outer end of the threaded rod, and loops carried by the yoke for encircling a fishing rod for clamping a reel thereto.

6. A fish line reel holder, comprising a base adapted to fit a fishing rod, a rod threaded therein, a yoke loosely mounted on the rod and held against longitudinal and lateral movement, a hand-hold rigidly carried by the outer end of the threaded rod, and loops removably hooked into openings in the yoke for encircling a fishing rod for clamping a reel thereto.

7. A fish line reel holder, comprising a base, adapted to fit a fishing rod, a rod threaded therein, a yoke loosely mounted on the rod and held against longitudinal and lateral movement, a hand-hold having a gripping surface at each end rigidly carried by the outer end of the threaded rod, and loops removably hooked into openings in the yoke for encircling a fishing rod for clamping a reel thereto.

8. A fish line reel holder, comprising a base, adapted to fit a fishing rod, a rod threaded therein, a yoke loosely mounted on the rod and held against longitudinal and lateral movement, a hand-hold rigidly carried by the outer end of the threaded rod and having a gripping surface at each end, and means carried by the yoke for clamping a fishing reel thereto.

9. A fish line reel holder, comprising a base adapted to fit a fishing rod, a rod threaded therein, a yoke loosely mounted on the rod and held against longitudinal and lateral movement, a hand-hold rigidly carried by the outer end of the threaded rod and having a gripping surface at each end, and adjustable means carried by the yoke for clamping a fishing reel thereto.

10. A fish line reel holder, comprising a base adapted to fit a fishing rod, a rod threaded therein, a yoke loosely mounted on the rod and held against longitudinal and lateral movement, a hand-hold rigidly carried by the outer end of the threaded rod and having a gripping surface at each end, and removable and adjustable means carried by the yoke for clamping a fishing reel thereto.

11. A fish line reel holder, comprising a base adapted to fit a fishing rod, a rod threaded in said base, a yoke loosely mounted on the rod and held against longitudinal and lateral movement thereon, a hand-hold having a gripping surface at each end rigidly secured to the end of the threaded rod, the yoke having openings arranged in series, and loops adapted to hook into any one of the openings of the series and encircling a fishing rod for clamping a reel thereto.

12. An improved clamp, comprising a base, a shaft movable therein, a loop for encircling a member, an operative connection between the loop and the shaft, and means for operating the shaft to pull the loop towards said base.

13. An improved device for clamping a fishing reel to a rod, comprising a base positioned upon the side of a fishing rod oppositely disposed to said reel, a shaft movably mounted in said base, means removably and adjustably connected to and carried by said shaft and encircling said rod for clamping the fishing rod reel in place thereon, and means for moving said shaft in said base.

14. An improved device comprising a base adapted to engage one side of a fishing rod, a shaft movably mounted in said base, a handle for operating said shaft, said handle being provided with a finger grip, and means connected to and movable with said shaft and encircling said rod for clamping a fishing reel thereon.

15. A clamp comprising a base, a shaft movable therein, a yoke mounted on and movable with said shaft, an operating handle for said shaft, and means carried by the yoke for encircling a member whereby the member can be clamped against the base upon movement of the shaft.

16. A fishing rod reel holder, comprising a base adapted to fit the fishing rod, a shaft movable within the base and carrying a yoke, an operating member for said shaft, and loops removably connected within openings provided in the yoke and encircling the fishing rod for clamping a reel thereto.

17. A fishing rod reel holder, comprising a base adapted to fit the rod, a shaft movable in said base towards and away from said rod, a plate carried by said shaft and provided with openings arranged in series, an operating member for said shaft, and loops detachably connected to the plate openings and encircling a rod for clamping a reel thereto.

18. A fishing rod reel holder, comprising a base adapted to fit the rod, a shaft movable in the base towards and away from said rod, a handle for operating said shaft and provided at each end with a finger hold, and loops connected to said shaft for encircling the fishing rod for clamping a reel thereon.

19. A fishing rod reel holder, comprising a base adapted to be applied to the rod, a shaft movable in the base towards and away from said rod, a handle for operating said shaft and provided with a finger hold, and loops connected to and movable with said shaft and encircling the fishing rod for clamping a reel thereon.

CHARLES JACKSON CLARKE.